US012646241B2

(12) United States Patent (10) Patent No.: US 12,646,241 B2
Deschaintre et al. (45) Date of Patent: Jun. 2, 2026

(54) SURFACE MATERIAL SEARCH TECHNIQUES VIA JOINT FEATURE COMPARISON SPACE

(71) Applicant: Adobe Inc., San Jose, CA (US)

(72) Inventors: Valentin Deschaintre, London (GB); Yannick Hold-Geoffroy, Quebec City (CA); Paul Guerrero, London (GB)

(73) Assignee: Adobe Inc., San Jose, CA (US)

( * ) Notice: Subject to any disclaimer, the term of this patent is extended or adjusted under 35 U.S.C. 154(b) by 301 days.

(21) Appl. No.: 18/242,764

(22) Filed: Sep. 6, 2023

(65) Prior Publication Data

US 2025/0078387 A1 Mar. 6, 2025

(51) Int. Cl.
*G06T 15/04* (2011.01)
*G06F 16/535* (2019.01)
*G06F 16/583* (2019.01)

(52) U.S. Cl.
CPC ............ *G06T 15/04* (2013.01); *G06F 16/535* (2019.01); *G06F 16/583* (2019.01)

(58) Field of Classification Search
None
See application file for complete search history.

(56) References Cited

U.S. PATENT DOCUMENTS 5,461,712 A * 10/1995 Chelstowski ........... G06T 15/04
345/543
5,933,823 A * 8/1999 Cullen ................... G06V 30/40

6,035,055 A * 3/2000 Wang .................. G06F 16/5838
707/E17.023
6,411,953 B1 * 6/2002 Ganapathy ........ G06F 18/24765
707/E17.025
6,631,364 B1 * 10/2003 Rioux ................. G06F 16/5854
8,686,992 B1 4/2014 Makadia
2002/0133489 A1 * 9/2002 Kim .................... G06F 16/5862
707/E17.025

(Continued)

OTHER PUBLICATIONS

"Blender—A 3D Modelling and Rendering Package", Blender Foundation, Stichting Blender Foundation, Accessed from Internet on Aug. 19, 2024, pp. 1-15.

(Continued)

*Primary Examiner* — Jason A Pringle-Parker
(74) *Attorney, Agent, or Firm* — Kilpatrick Townsend & Stockton LLP

(57) ABSTRACT

A material search computing system generates a joint feature comparison space by combining joint image-text features of surface material data objects. The joint feature comparison space is a consistent comparison space. The material search computing system extracts a query joint feature set from a query data object that includes text data or image data. In addition, the material search computing system compares the query joint feature set to the joint image-text features included in the joint feature comparison space. Based on the comparison, the material search computing system identifies a result joint feature set and associated result surface material data objects. The material search computing system generates material query result data describing the result surface material data objects, and provides the material query result data to an additional computing system.

20 Claims, 5 Drawing Sheets

Computing
Environment 100

(56) References Cited

U.S. PATENT DOCUMENTS

| | | | | |
|---|---|---|---|---|
| 2003/0109940 A1* | 6/2003 | Guntzer | | G06F 16/5862 |
| | | | | 707/E17.025 |
| 2011/0153653 A1* | 6/2011 | King | | G06F 16/5846 |
| | | | | 707/769 |
| 2012/0239638 A1* | 9/2012 | Bennett | | G06F 16/532 |
| | | | | 707/E17.109 |
| 2014/0267247 A1 | 9/2014 | Chen et al. | | |
| 2015/0039583 A1* | 2/2015 | Liu | | G06F 16/9538 |
| | | | | 707/706 |
| 2017/0024925 A1* | 1/2017 | Palmer | | G06T 19/20 |
| 2017/0097948 A1* | 4/2017 | Kerr | | G06F 16/532 |
| 2020/0019807 A1* | 1/2020 | Ma | | G06V 10/454 |
| 2020/0226773 A1* | 7/2020 | Gan | | G06N 3/088 |
| 2020/0321026 A1* | 10/2020 | Tian | | G06F 16/438 |
| 2020/0380403 A1* | 12/2020 | Aggarwal | | G06F 16/583 |
| 2022/0189062 A1 | 6/2022 | Seo et al. | | |
| 2023/0206566 A1 | 6/2023 | Kim et al. | | |
| 2024/0290054 A1 | 8/2024 | Yin et al. | | |
| 2025/0126353 A1 | 4/2025 | Ben Hariz et al. | | |

OTHER PUBLICATIONS

"GPT-4V(ision) System Card", OpenAI, Available online at: https://cdn.openai.com/papers/GPTV_System_Card.pdf, Sep. 25, 2023, pp. 1-18.

"Poly Haven", Available online at: https://polyhaven.com/, Accessed from Internet on Aug. 16, 2024, pp. 1-14.

"Stable Diffusion", Available online at: https://github.com/Stability-AI/stablediffusion, 2023, 7 pages.

"Substance 3D Assets", Adobe, Available online at: https://substance3d.adobe.com/assets/, Accessed from Internet on Aug. 16, 2024, pp. 1-9.

U.S. Appl. No. 18/458,032, Non-Final Office Action, Mailed On May 21, 2025, 17 pages.

Avrahami et al., "Blended Diffusion for Text-driven Editing of Natural Images", In Proceedings of the Institute of Electrical and Electronics Engineers/CVF Conference on Computer Vision and Pattern Recognition (CVPR), 2022, pp. 18208-18218.

Barnes et al., "PatchMatch: A Randomized Correspondence Algorithm for Structural Image Editing", Association for Computing Machinery Transactions on Graphics, vol. 28, No. 3, Aug. 2009, 10 pages.

Berkiten et al., "Learning Detail Transfer Based on Geometric Features", Computer Graphics Forum, vol. 36, No. 2, May 2017, 13 pages.

Bradski , "The OpenCV Library", Dr. Dobb's Journal of Software Tools, Nov. 1, 2000, 7 pages.

Cao et al., "TexFusion: Synthesizing 3D Textures with Text-guided Image Diffusion Models", In Proceedings of the Institute of Electrical and Electronics Engineers/CVF International Conference on Computer Vision, Oct. 20, 2023, pp. 4169-4181.

Ceylan et al., "MatAtlas: Text-driven Consistent Geometry Texturing and Material Assignment", Available online at: https://arxiv.org/pdf/2404.02899, Apr. 19, 2024, pp. 14-19.

Ceylan et al., "Pix2Video: Video Editing using Image Diffusion", International Conference on Computer Vision Paper 2023, Mar. 22, 2023, pp. 23206-23217.

Chang et al., "Shape Net: An information-Rich 3D Model Repository", Available Online at: https://arxiv.org/pdf/1512.03012, Dec. 9, 2015, pp. 1-11.

Chen et al., "Fantasia3D: Disentangling Geometry and Appearance for High-quality Text-to-3D Content Creation", arXiv preprint arXiv:2303.13873, Sep. 27, 2023, pp. 22246-22256.

Chen et al., "Non-Parametric Texture Transfer Using MeshMatch", Adobe Technical Report 2012-2, Nov. 2012, pp. 1-9.

Chen et al., "Text2Tex: Text-Driven Texture Synthesis via Diffusion Models", In Proceedings of the Institute of Electrical and Electronics Engineers/CVF International Conference on Computer Vision (ICCV), Mar. 20, 2023, pp. 18558-18568.

Deitke et al., "Objaverse: A Universe of Annotated 3D Objects", In Proceedings of the Institute of Electrical and Electronics Engineers/The Computer Vision Foundation Conference on Computer Vision and Pattern Recognition, Dec. 15, 2022, pp. 1-15.

Demes , "AmbientCG", Available online at: https://ambientcg.com/, Accessed from Internet on Aug. 15, 2024, pp. 1-8.

Deschaintre et al., "Guided Fine-tuning for Large-scale Material Transfer", In Computer Graphics Forum, vol. 39, No. 4, Jul. 2020, pp. 91-105.

Deschaintre et al., "The Visual Language of Fabrics", Association for Computing Machinery Transactions on Graphics, vol. 42, No. 4, Jul. 25, 2023, pp. 1-15.

Dong et al., "Optimized Tile-Based Texture Synthesis", In Proceedings of Graphics Interface, Jun. 6, 2007, 8 pages.

Efros et al., "Image Quilting for Texture Synthesis and Transfer", Proceedings of the 28th Annual Conference on Computer Graphics and Interactive Techniques, Aug. 12-17, 2001, 6 pages.

Efros et al., "Texture Synthesis By Non-Parametric Sampling", Proceedings of the Seventh Institute of Electrical and Electronics Engineers International Conference on Computer Vision, Sep. 20, 1999, 6 pages.

Gao et al., "TextDeformer: Geometry Manipulation Using Text Guidance", In Association for Computing Machinery Transactions on Graphics, Apr. 26, 2023, pp. 1-9.

Geyer et al., "TokenFlow: Consistent Diffusion Features for Consistent Video Editing", Available online at: https://arxiv.org/pdf/2307.10373, Nov. 20, 2023, pp. 1-13.

Heeger et al., "Pyramid-Based Texture Analysis/synthesis", In Proceedings International Conference on Image Processing, vol. 3, Sep. 15, 1995, pp. 229-238.

Heusel et al., "GANs Trained by a Two Time-Scale Update Rule Converge to a Local Nash Equilibrium", Proceedings of the 31st International Conference on Neural Information Processing Systems, Dec. 2017, pp. 1-12.

Ho et al., "Classifier-Free Diffusion Guidance", Computer Science, Available online at: https://arxiv.org/pdf/2207.12598, Jul. 26, 2022, pp. 1-14.

Hollein et al., "Text2Room: Extracting Textured 3D Meshes from 2D Text-to-Image Models", In Proceedings of the Institute of Electrical and Electronics Engineers/CVF International Conference on Computer Vision, 2023, pp. 7909-7920.

Khalid et al., "CLIP-Mesh: Generating Textured Meshes from Text Using Pretrained Image-Text Models", Special Interest Group on Computer Graphics and Interactive Techniques Asia 2022 Conference Papers, Sep. 2, 2022, pp. 1-8.

Kholgade et al., "3D Object Manipulation in a Single Photograph Using Stock 3D Models", Association for Computing Machinery Transactions on graphics, vol. 33, No. 4, Jul. 27, 2014, 13 pages.

Kopf et al., "Solid Texture Synthesis from 2D Exemplars", Association for Computing Machinery Transactions on Graphics, vol. 26, No. 3, Jul. 29, 2007, 10 pages.

Kraevoy et al., "Matchmaker: Constructing Constrained Texture Maps", Association for Computing Machinery Transactions on Graphics, vol. 22, No. 3, Jul. 1, 2003, pp. 326-333.

Kwatra et al., "Graphcut Textures: Image and Video Synthesis Using Graph Cuts", Association for Computing Machinery Transactions on Graphics, vol. 22, No. 3, Jul. 1, 2003, 10 pages.

Kwatra et al., "Texture Optimization for Example-Based Synthesis", Association for Computing Machinery Transactions on Graphics, vol. 24, No. 3, Jul. 1, 2005, pp. 795-802.

Lefebvre et al., "Appearance-space Texture Synthesis", Association for Computing Machinery Transactions on Graphics, vol. 25, No. 3, Jul. 1, 2006, pp. 541-548.

Li et al., "Instant3D: Fast Text-to-3D with Sparse-view Generation and Large Reconstruction Model", Available online at: https://arxiv.org/pdf/2311.06214, Nov. 23, 2023, pp. 1-25.

Li et al., "Sweetdreamer: Aligning Geometric Priors in 2D Diffusion for Consistent Text-to-3D", arXiv preprint arXiv:2310.02596, Oct. 20, 2023, pp. 1-18.

Lin et al., "Magic3D: High-Resolution Text-to-3D Content Creation", In Proceedings of the Institute of Electrical and Electronics Engineers/The Computer Vision Foundation Conference on Computer Vision and Pattern Recognition, Mar. 25, 2023, pp. 300-309.

(56)                   References Cited

OTHER PUBLICATIONS

Liu et al., "Syncdreamer: Learning to Generate Multiview-consistent Images from a Single-view Image", Published as a Conference Paper at ICLR, Apr. 15, 2024, pp. 1-22.
Liu et al., "Zero-1-to-3: Zero-shot One Image to 3D Object", In Proceedings of the Institute of Electrical and Electronics Engineers/ CVF International Conference on Computer Vision, Mar. 20, 2023, pp. 9298-9309.
Long et al., "Wonder3D: Single Image to 3D Using Cross-Domain Diffusion", Available online at: https://openaccess.thecvf.com/content/ CVPR2024/papers/Long_Wonder3D_Single_Image_to_3D_using_ Cross-Domain_Diffusion_CVPR_2024_paper.pdf, 2024, pp. 9970-9980.
Lu et al., "Context-aware Textures", Association for Computing Machinery Transactions on Graphics, vol. 26, No. 1, Jan. 1, 2007, pp. 1-31.
Meng et al., "SDEdit: Guided Image Synthesis and Editing With Stochastic Differential Equations", In International Conference on Learning Representations, Jan. 5, 2022, pp. 1-33.
Mertens et al., "Texture Transfer Using Geometry Correlation", EGSR '06: Proceedings of the 17th Eurographics conference on Rendering Techniques, Jun. 26, 2006, pp. 273-284.
Metzer et al., "Latent-NeRF for Shape-Guided Generation of 3D Shapes and Textures", In Proceedings of the Institute of Electrical and Electronics Engineers/CVF Conference on Computer Vision and Pattern Recognition, 2023, pp. 12663-12673.
Michel et al., "Text2mesh: Text-driven Neural Stylization for Meshes", In Proceedings of the Institute of Electrical and Electronics Engineers/ CVF Conference on Computer Vision and Pattern Recognition, 2022, pp. 13492-13502.
Oechsle et al., "Texture Fields: Learning Texture Representations in Function Space", In Proceedings of the Institute of Electrical and Electronics Engineers/CVF International Conference on Computer Vision 2019, 2019, pp. 4531-4540.
Park et al., "Photoshape: Photorealistic Materials for Large-scale Shape Collections", Association for Computing Machinery Transactions on Graphics, vol. 37, No. 6, Nov. 2018, pp. 192:1-192:12.
Phong , "Illumination for Computer Generated Pictures", Graphics and Image Processing, 1998, pp. 95-101.
Poole et al., "Dreamfusion: Text-to-3D Using 2D Diffusion", Available Online at: https://arxiv.org/abs/2209.14988, Sep. 29, 2022, pp. 1-18.
Portilla et al., "A Parametric Texture Model Based on Joint Statistics of Complex Wavelet Coefficients", International Journal of Computer Vision, vol. 40, No. 1, Oct. 2000, pp. 49-71.
Qian et al., "Magic123: One Image to High-quality 3D Object Generation Using Both 2D and 3D Diffusion Priors", arXiv preprint arXiv:2306.17843, Jul. 23, 2023, pp. 1-18.
Ramesh et al., "Hierarchical Text-Conditional Image Generation with CLIP Latents", Available online at: https://arxiv.org/pdf/2204. 06125, Apr. 13, 2022, pp. 1-27.
Richardson et al., "TEXTure: Text-Guided Texturing of 3D Shapes", In SIGGRAPH 2023 Conference Proceedings, Association for Computing Machinery, Feb. 3, 2023, pp. 1-13.
Rodrigues et al., "Part-Based Mesh Segmentation: A Survey", In Computer Graphics Forum, vol. 37, No. 6, Sep. 2018, pp. 235-274.
Rombach et al., "High-Resolution Image Synthesis with Latent Diffusion Models", In Proceedings of the Institute of Electrical and Electronics Engineers/CVF Conference on Computer Vision and Pattern Recognition, Apr. 13, 2022, pp. 1-45.
Ruiz et al., "DreamBooth: Fine Tuning Text-To-Image Diffusion Models for Subject-Driven Generation", Institute of Electrical and Electronics Engineers/CVF Conference on Computer Vision and Pattern Recognition (CVPR), Mar. 15, 2023, 25 pages.

Shi et al., "MVDream: Multi-view Diffusion for 3D Generation", Available online at: https://arxiv.org/pdf/2308.16512, Apr. 18, 2024, pp. 1-21.
Shi et al., "Zero123++: a Single Image to Consistent Multi-view Diffusion Base Model", arXiv preprint arXiv:2310.15110, Oct. 23, 2023, pp. 1-9.
Siddiqui et al., "Texturify: Generating Textures on 3D Shape Surfaces", In European Conference on Computer Vision, Oct. 23, 2022, pp. 1-24.
Sun et al., "DreamCraft3D: Hierarchical 3D Generation with Bootstrapped Diffusion Prior", Available online at: https://arxiv.org/ pdf/2310.16818, Oct. 26, 2023, pp. 1-20.
Tang et al., "DreamGaussian: Generative Gaussian Splatting for Efficient 3D Content Creation", Available online at: https://arxiv. org/pdf/2309.16653, Mar. 29, 2024, pp. 1-18.
Tang et al., "Text-Guided High-Definition Consistency Texture Model", arXiv preprintarXiv:2305.05901, May 10, 2023, pp. 1-11.
Tsalicoglou et al., "Textmesh: Generation of Realistic 3D Meshes from Text Prompts", International Conference on 3D Vision (3DV), Apr. 24, 2023, pp. 1554-1563.
Turk , "Texture Synthesis on Surfaces", In Proceedings of the 28th Annual Conference on Computer Graphics and Interactive Techniques, Aug. 1, 2001, pp. 347-354.
Tzur et al., "Flexistickers: Photogrammetric Texture Mapping Using Casual Images", Association for Computing Machinery Transactions on Graphics, vol. 28, No. 3, Aug. 2009, pp. 1-10.
Wang et al., "Breathing New Life Into 3D Assets with Generative Repainting", In Proceedings of the British Machine Vision Conference (BMVC). BMVA Press, Oct. 18, 2023, pp. 1-12.
Wang et al., "ProlificDreamer: High-Fidelity and Diverse Text-to-3D Generation with Variational Score Distillation", arXiv preprint arXiv:2305.16213, Nov. 22, 2023, pp. 1-36.
Wang et al., "Score Jacobian Chaining: Lifting Pretrained 2D Diffusion Models for 3D Generation", Available online at: https:// openaccess.thecvf.com/content/CVPR2023/papers/Wang_Score_ Jacobian_Chaining_Lifting_Pretrained_2D_Diffusion_Models_for_ 3D_CVPR_2023_paper.pdf, 2023, pp. 12619-12629.
Wang et al., "Unsupervised Texture Transfer from Images to Model Collections", Association for Computing Machinery Transactions on Graphics, vol. 35, No. 6, Nov. 11, 2016, 13 pages.
Wei et al., "State of the Art in Example-based Texture Synthesis", Eurographics 2009, State of the Art Report, EG-STAR, Eurographics Association Available online at: https://inria.hal.science/inria-00606853/document, Mar. 2009, 26 pages.
Wei et al., "Texture Synthesis Over Arbitrary Manifold Surface", In Proceedings of the 28th Annual Conference on Computer Graphics and Interactive Techniques, Aug. 1, 2001, pp. 355-360.
Yan et al., "Psdr-room: Single Photo to Scene Using Differentiable Rendering", In Special Interest Group on Computer Graphics and Interactive Techniques Asia 2023 Conference Papers, Dec. 10, 2023, pp. 1-11.
Yu et al., "Texture Generation on 3D Meshes with Point-UV Diffusion", In Proceedings of the Institute of Electrical and Electronics Engineers/CVF International Conference on Computer Vision, 2023, pp. 4206-4216.
Zhang et al., "Adding Conditional Control to Text-to-image Diffusion Models", In Proceedings of the Institute of Electrical and Electronics Engineers International Conference on Computer Vision, Feb. 2023, pp. 3836-3847.
Zhang et al., "The Unreasonable Effectiveness of Deep Features as a Perceptual Metric", In Proceedings of the Institute of Electrical and Electronics Engineers Conference on Computer Vision and Pattern Recognition, Apr. 10, 2018, pp. 1-14.
A. Radford, et al., CLIP: Connecting text and images, Open AI, Jan. 5, 2021.
Nikos Kafritsas, Clip: The Most Influential AI Model From Open AI—And How to Use It, Towards Data Science, Sep. 26, 2022.

* cited by examiner

Figure 1

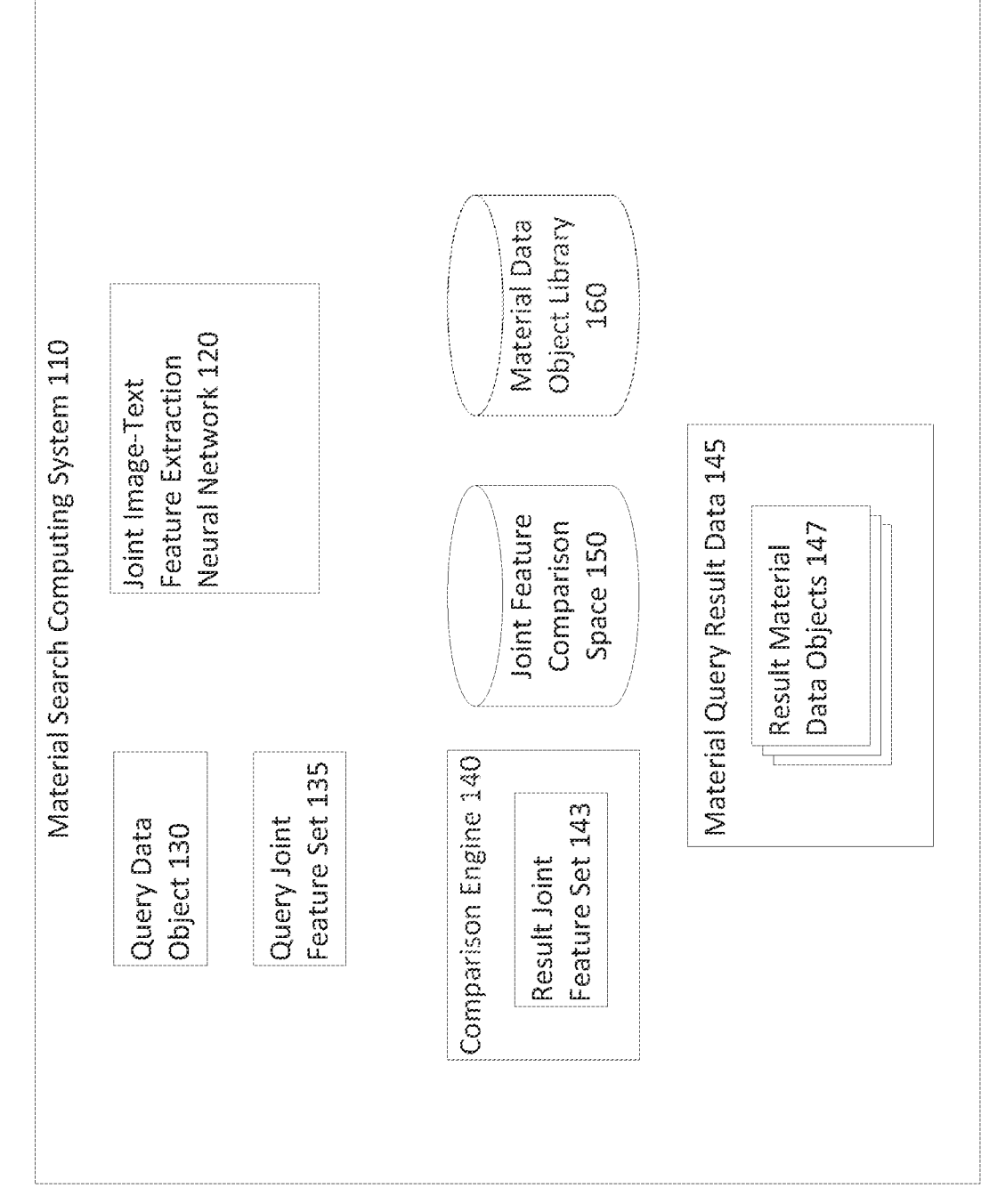

Computing
Environment 100

Material Search Computing System 110

Joint Image-Text
Feature Extraction
Neural Network 120

Query Data
Object 130

Query Joint
Feature Set 135

Comparison Engine 140

Result Joint
Feature Set 143

Joint Feature
Comparison
Space 150

Material Data
Object Library
160

Material Query Result Data 145

Result Material
Data Objects 147

User Computing
Device 190

User Interface
195

Rendering
Engine 197

Figure 2

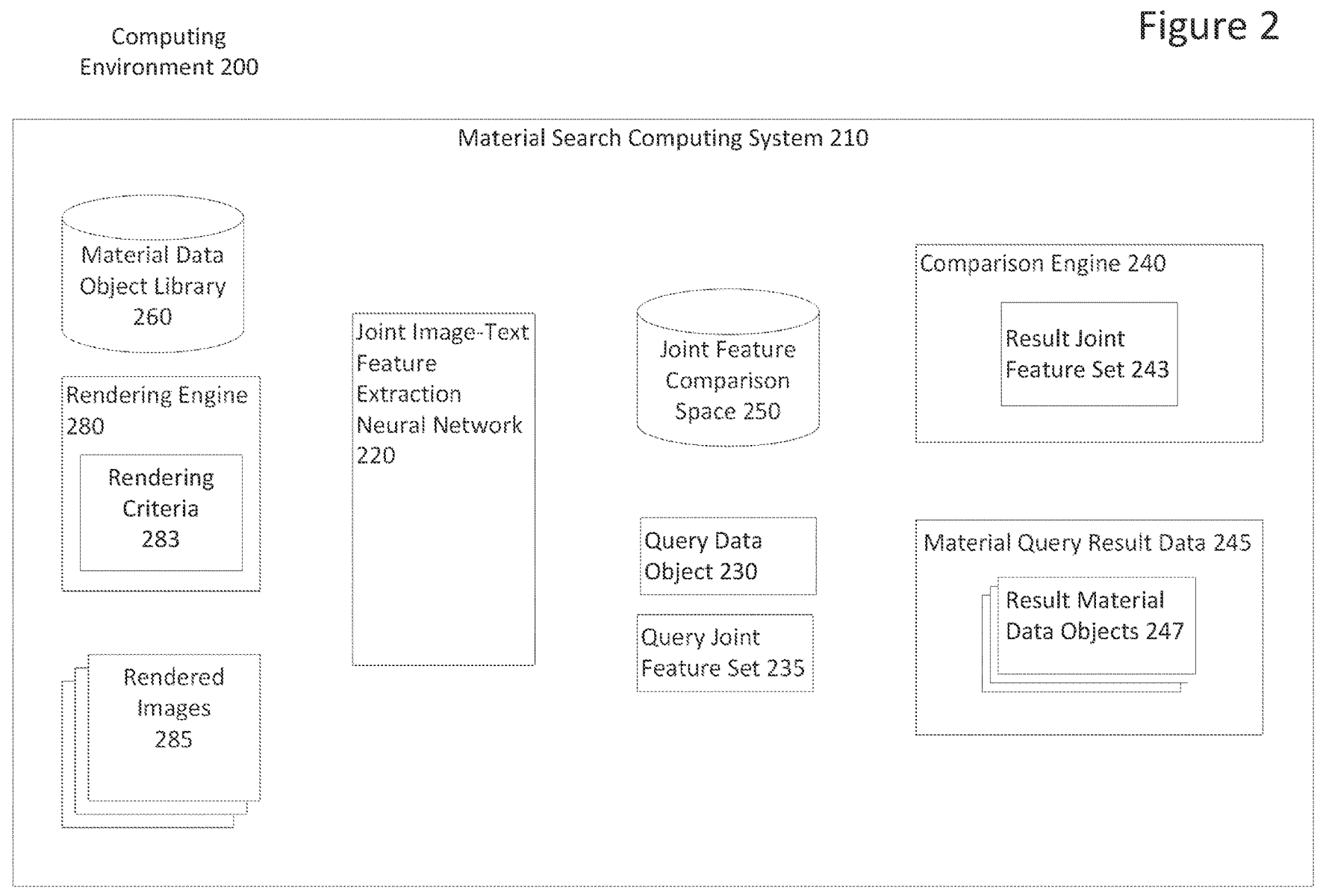

Computing Environment 200

Material Search Computing System 210

Comparison Engine 240

Result Joint Feature Set 243

Material Query Result Data 245

Result Material Data Objects 247

Joint Feature Comparison Space 250

Query Data Object 230

Query Joint Feature Set 235

Joint Image-Text Feature Extraction Neural Network 220

Material Data Object Library 260

Rendering Engine 280

Rendering Criteria 283

Rendered Images 285

300

400

SURFACE MATERIAL SEARCH TECHNIQUES VIA JOINT FEATURE COMPARISON SPACE

TECHNICAL FIELD

This disclosure relates generally to the field of three-dimensional digital objects, and more specifically relates to techniques for selecting a material appearance for a three-dimensional digital object.

BACKGROUND

A digital graphical design environment can include digital graphical objects with various materials. The visual appearance of the materials can resemble, for example, wood, metal, fur, grass, leather, or other materials that have various appearances. In some cases, a graphical designer, such as a person who selects or generates digital graphical objects, can utilize a graphical design environment to select a material for a graphical object. For example, the graphical designer can use a user interface of the graphical design environment to identify or evaluate multiple materials with multiple visual appearances, such as during development of a digital graphical object. In some cases, it is desirable for a user interface of a graphical design environment to be highly responsive to interactions by the graphical designer, such as fast presentation of multiple suitable materials for evaluation by the graphical designer.

Existing techniques to identify or evaluate materials in a graphical design environment include searching for materials using text input, such as entering keywords to describe a desired material. However, contemporary techniques for material searching using text input can disregard characteristics of the materials that are being searched, relying instead on text descriptions, such as keywords, that are associated with the materials that are being searched.

SUMMARY

According to certain embodiments, a material search computing system generates a joint feature comparison space based on a combination of joint image-text features of a group of surface material data objects. A joint image-text feature extraction neural network, such as neural network trained to implement a vision-language model, included in the material search computing system extracts the joint image-text features from rendered digital images of the surface material data objects. In some cases, the material search computing system renders the digital images based on comparison space rendering parameters that indicate consistent characteristics for rendering. In addition, the material search computing system generates the joint feature comparison space as a consistent comparison space, based on the joint image-text features extracted from the digital images rendered with the consistent characteristics.

According to certain embodiments, the material search computing system receives a query data object that includes text data or image data. Based on the query data object, the joint image-text feature extraction neural network extracts a query joint feature set. A comparison engine included in the material search computing system accesses the joint feature comparison space and compares the query joint feature set to the joint image-text features included in the joint feature comparison space. Based on the comparison, the comparison engine identifies a result joint feature set. The material search computing system identifies one or more result surface material data objects that are associated with the result joint feature set and provides material query result data describing the result surface material data objects to an additional computing system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where:

FIG. 1 is a block diagram depicting an example of a computing environment in which one or more surface material query results are determined by encoding features of one or more query data objects in a joint feature comparison space, according to certain embodiments;

FIG. 2 is a block diagram depicting an example of a computing environment in which a material search computing system is configured for generating a joint feature comparison space, according to certain embodiments;

DETAILED DESCRIPTION

Figure 3:
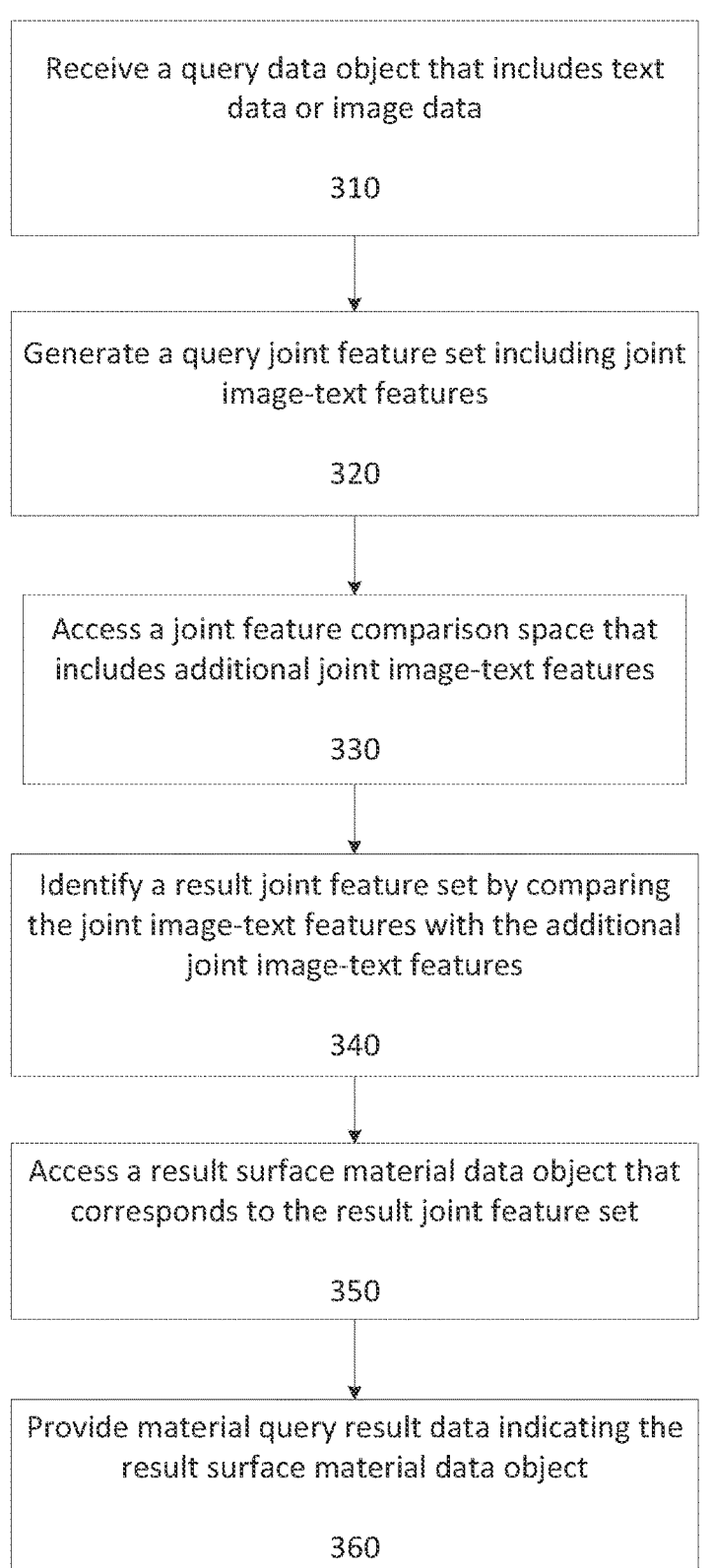
FIG. 3 is a flow chart depicting an example of a process for determining surface material query results by comparing joint image-text feature sets that are encoded in a joint feature comparison space, according to certain embodiments.

As discussed above, prior techniques for surface material searching, or otherwise identifying materials for three-dimensional graphical objects, can disregard visual characteristics of materials that are being searched. In some cases, disregarding the characteristics of searched materials can reduce efficiency of a search, such as returning unsuitable material results that do not meet the expectations of a graphical designer who has implemented the search. In addition, returning unsuitable material results can increase time and other resources devoted to human efforts, including the time of the graphic developer who may have to sort through several batches of unsuitable search results. Furthermore, rendering materials at a high level of detail, such as highly detailed renderings that enable a graphical designer to accurately evaluate the appearance of the material, can be a computationally intensive task, utilizing a relatively large amount of computing resources for each material being rendered. In some cases, returning unsuitable material results can allocate computing resources inefficiently, such as allocating computing resources for rendering unsuitable materials as part of the search result.

Certain embodiments described herein provide for a material search computing system that implements surface material search techniques using a joint feature comparison space. Embodiments of the material search computing system described herein implement the surface material search techniques by incorporating visual features of surfaces materials for three-dimensional graphical objects in determining a response to a search query. A material feature search computing system includes a neural network, such as a neural network implementing a vision-language model, that is trained to identify visual features of surface materials that are described in data objects. In addition, the material feature search computing system uses the neural network implementing the vision-language model to identify features of a search query input, such as a text input or a digital image input. The material search computing system encodes the features of the search query input and the surface material data objects into a joint feature comparison space, such as a comparison space data object that describes a common embedding space in which joint image-text features can be encoded. In some cases, the joint feature comparison space improves searching for surface materials that can be applied to three-dimensional graphical objects. For example, the material search computing system can identify more accurate search results by comparing, within the joint feature comparison space, the features of the search query input and the surface material data objects. In addition, the material search computing system can reduce computation resource usage related to rendering the search results on a user interface, such as by omitting less relevant material data object from the search results provided to a user computing device. In some cases, a neural network implementing a vision-language model is trained on image-text pairs, such as a very large data set that includes a very large quantity (e.g., hundreds of millions) of image-text pairs. In addition, the trained neural network implementing the vision-language model can provide high-relevance search output responsive to both text input and image input, such as high-relevance search output that includes search results with semantic similarity (e.g., data objects representing various types of bricks) in addition to or instead of search results with visual similarity (e.g., data objects representing rough grey surfaces).

The following examples are provided to introduce certain embodiments of the present disclosure. A material search computing system generates a joint feature comparison space that includes a combination of joint image-text features describing visual appearances of multiple surface material data objects. The joint image-text features for the multiple surface material data objects are extracted via a vision-language model implemented by a joint image-text feature extraction neural network that is applied to digital images depicting the surface material data objects. The material search computing system generates the digital images based on comparison space rendering parameters that indicate consistent characteristics for rendering of the surface material data objects. In addition, the material search computing system receives, from an additional computing system, a query data object that includes text data or image data. The material search computing system determines joint image-text features for the query data object and compares the joint image-text features for the query data object with the joint image-text features of the multiple surface material data objects. For example, the material search computing system can embed the joint image-text features for the query data object in the joint feature comparison space. Based on the comparison, the material search computing system determines a result surface material data object, such as a result material data object that is associated with joint image-text features within a threshold distance (e.g., within the joint feature comparison space) from the joint image-text features for the query data object. In addition, the material search computing system generates material query result data that describes or includes the result surface material data object and provides the material query result data to an additional computing system.

Certain embodiments described herein provide improvements to surface material search computing systems. For example, a material search computing system described herein generates a joint feature comparison space that provides a consistent comparison space for query data objects by applying particular rules for rendering digital images depicting surface material data objects, such as particular rules describing one or more comparison space rendering parameters. In addition, the described material search computing system generates the described joint feature comparison space by applying particular rules for extracting joint image-text features of the rendered digital images for the surface material data objects, such as particular rules that implement a joint image-text feature extraction neural network. In some cases, application of these rules achieves one or more improved technological results, such as technological results that include improving accuracy of query result data describing result surface material data objects or increasing efficient usage of computing resources utilized for the rendering result surface material data objects in response to receiving a query data object. In some cases, application of these rules achieves one or more improved outcomes in a technological field, such as improving technological fields of graphical design by reducing time, effort, and additional resources expended by a person, such as a graphical designer, who is performing tasks related to the technological fields of graphical design. For example, a joint feature comparison space generated based on the described techniques can provide a comparison space in which free-form search is supported for text, images, or other types of input selected by a graphical designer. The example joint feature comparison space can eliminate or reduce technical restrictions on a search computing system, such as technical restrictions that limit inputs to pre-selected keyword libraries, that curtail the graphical designer's creative approaches to identify suitable surface materials for a graphic design project.

Referring now to the drawings, FIG. 1 depicts an example of a computing environment 100 in which one or more surface material query results are determined by encoding features of one or more query data objects in a joint feature comparison space. The computing environment 100 includes a material search computing system 110 and one or more additional computing systems, such as a user computing device 190. In the computing environment 100, the material search computing system 110, the user computing device 190, and one or more additional computing systems are configured to exchange data via one or more computing networks, such as a local or wide area network.

In some embodiments, the user computing device 190 includes a user interface, such as a user interface 195. The user computing device 190 configures the user interface 195 based on data that is exchanged with the material search computing system 110. For example, the user computing device 190 receives from the material search computing system 110 interface data that describes the user interface 195. Responsive to receiving the interface data, the user computing device 190 configures one or more user interface devices (e.g., a display device, an audio device) to provide the user interface 195. In some cases, the user interface 195 includes one or more regions for receiving user input, such as a field to receive search query input data (e.g., text data, image data, surface material data) that can be provided to the material search computing system 110. In addition, the user interface 195 includes one or more regions for displaying output, such as an area to display material query result data (e.g., digital objects rendered with result materials, images of result materials) that is received from the material search computing system 110. In some cases, the user computing device 190 includes a rendering engine 197 that is configured to render one or more digital graphical objects, such as in a three-dimensional graphical environment of the user computing device 190. For example, responsive to receiving material query result data from the material search computing system 110, the rendering engine 197 could render one or more digital graphical objects in a graphical design environment of the user computing device 190. In addition, responsive to receiving surface material data as search query input data, the rendering engine 197 could render one or more images (e.g., input images) that depict an appearance of the input surface material data. In some cases, the user interface 195 includes, or is otherwise capable of providing, a three-dimensional digital graphical design environment via which the rendering engine 197 provides one or more rendered digital graphical objects.

In FIG. 1, the material search computing system 110 includes one or more of a joint image-text feature extraction neural network 120 or a joint feature comparison space 150. For convenience, a joint image-text feature extraction neural network may also be referred to herein as a joint feature neural network. In some cases, the material search computing system 110 generates the joint feature comparison space 150 as a common embedding space for multi-type features, such as an embedding space in which image features and text features can be commonly encoded. In addition, the material search computing system 110 generates the joint feature comparison space 150 based on a combination of features that are identified by the joint feature neural network 120. For example, the material search computing system 110 includes, or is otherwise capable of accessing, a material data object library 160. The material data object library 160 includes multiple surface material data objects (also referred to herein as material data objects) that describe respective visual appearances, such as material data objects that can be applied to a three-dimensional graphical object (e.g., during rendering) to create respective visual appearances for a surface of the graphical object. In some cases, one or more of the material data objects included in the library 160 includes, or is otherwise associated with, text data that describes respective appearances of the one or more material data objects. In addition, one or more of the material data objects included in the library 160 includes, or is otherwise associated with, image data that depicts the respective appearances of the one or more material data objects. For example, the material data object library 160 can include a first material data object that provides a visual appearance of a brick wall for a three-dimensional graphical object. In this example, the first material data object can be associated with first text data that describes the respective appearance of the first material data object, such as text data that describes "brick," "red brick," "red brick surface for wall or sidewalk," or other types of text data that describe a visual appearance provided by the first material data object. In addition, the first material data object can be associated with first image data that describes the respective appearance of the first material data object, such as a digital image that depicts a red brick surface which can be rendered via the first material data object. In some cases, the first image data is generated by the material search computing system 110, such as via a rendering engine included in the material search computing system 110.

In FIG. 1, the material search computing system 110 extracts, via the joint feature neural network 120, features of one or more material data objects that are included in material data object library 160. In some cases, the joint feature neural network 120 implements a vision-language model that is trained to extract features of text input and image input. In addition, the joint feature neural network 120 extracts joint image-text features from respective images rendered from the material data objects. Continuing with the example first material data object, the joint feature neural network 120 can extract joint image-text features that indicate appearance characteristics of the first material data object, such as features that indicate brick, red brick, aged brick, dark-colored mortar, or other appearance characteristics of the first material data object. In some cases, the joint feature neural network 120 can extract joint image-text features that describe a visual appearance of the first material data object more accurately as compared to the first text data, such as by extracting joint image-text features that indicate appearance characteristics not described in the first text data.

In the computing environment 100, the material search computing system 110 generates the joint feature comparison space 150 by combining joint image-text features that are extracted from multiple material data objects included in material data object library 160. In some cases, the joint feature comparison space 150 is a data object that describes a vector embedding space in which joint image-text features can be encoded. As an example, the joint feature comparison space 150 may be implemented as a numerical data object in which each joint image-text feature is represented as an angular vector having one or more relationships with additional angular vectors representing additional joint image-text features. Additional implementations of a joint feature comparison space are possible.

In some embodiments, the material search computing system 110 receives one or more sets of query data from at least one additional computing system. For example, the material search computing system 110 receives a query data object 130 from the user computing device 190. In some cases, the query data object 130 is generated based on one or more user inputs received by the user computing device 190, such as one or more user inputs indicating text data or image data that are received via the user interface 195. In some cases, the material search computing system 110 could receive query data that includes an additional surface material data object that is received via the user interface 195. In this example, the query data object 130 is generated based on a rendered image of the additional surface material data object, such as an input rendered image generated via the rendering engine 197 or an additional rendering engine included in the material search computing system 110.

Based on the query data object 130, the material search computing system 110 generates at least one set of joint image-text features, such as a query joint feature set 135. In some cases, the material search computing system 110 generates the query joint feature set 135 by applying the joint feature neural network 120 to the query data object 130. In addition, the joint feature neural network 120 can extract joint image-text features that indicate characteristics of the query data object 130. For example, if the query data object 130 includes text data, the joint feature neural network 120 extracts joint image-text features that indicate characteristics of the text data. In addition, if the query data object 130 includes image data, the joint feature neural network 120 extracts joint image-text features that indicate characteristics of the image data. In some cases, the material search computing system 110 generates multiple sets of joint image-text features based on a particular query data object. For example, if the material search computing system 110 receives a particular query data object that includes text data and image data, the joint feature neural network 120 can extract a first set of joint image-text features that indicate characteristics of the text data and a second set of joint image-text features that indicate characteristics of the image data.

Based on the query joint feature set 135, the material search computing system 110 identifies one or more result surface material data objects, such as a group of one or more result material data objects 147. In some cases, the material search computing system 110 includes a comparison engine 140 that is configured to compare the query joint feature set 135 to additional joint image-text features that are included in the joint feature comparison space 150. In addition, the material search computing system 110 identifies the result material data objects 147 based on the comparison of the query joint feature set 135 to the additional joint image-text features are in the joint feature comparison space 150. For example, the comparison engine 140 could calculate one or more relationships between or among the query joint feature set 135 and the additional joint image-text features in the joint feature comparison space 150. Examples of calculated relationships can include a cosine distance, a Manhattan distance, a root-mean-square error, or other types of relationships that can be calculated among vector data objects. Based on the comparison, the comparison engine 140 identifies, from the joint feature comparison space 150, at least one set of joint image-text features, such as a result joint feature set 143. In some cases, the comparison engine 140 identifies the result joint feature set 143 based on a determination that the result joint feature set 143 fulfills one or more comparison criteria, such as being within a threshold cosine distance from the query joint feature set 135, inclusion in a group of K nearest neighbors, or other suitable comparison criteria among vector data objects.

In the computing environment 100, the material search computing system 110 determines the result material data objects 147 based on the result joint feature set 143. For example, the comparison engine 140 (or another component of the material search computing system 110) can identify, from the material data object library 160, the result material data objects 147 that correspond to the result joint feature set 143, such as surface material data objects from which the joint image-text features in the set 143 were extracted. In FIG. 1, the material search computing system 110 generates material query result data 145 that includes (or otherwise indicates) the result material data objects 147. In some cases, the material search computing system 110 provides the material query result data 145 to the user computing device 190. In some cases, the user computing device 190 generates or modifies the user interface 195 in response to receiving the material query result data 145. For example, responsive to determining that the material query result data 145 include image data describing one or more of the result material data objects 147, the user computing device 190 modifies the user interface 195 to display the image data, such as in an output region. In addition, responsive to determining that the material query result data 145 include one or more of the result material data objects 147, the user computing device 190 modifies the user interface 195 to display one or more digital graphical objects, e.g., rendered via the rendering engine 197, that have respective material appearances as described by the result material data objects 147. In FIG. 1 the material search computing system 110 is described as providing the material query result data 145 to the user computing device 190, but other implementations are possible. For example, a material search computing system could generate material query result data that describes a group of result material data objects that are not included in the result data, such as material query result data describing network links to an additional computing system that stores the result material data objects.

In some cases, a material search computing system generates a joint feature comparison space based on a group of one or more rendered images. The rendered images, in some cases, are generated by the material search computing system (or an additional computing system) based on a particular set of rendering criteria for generating a joint feature comparison space. For example, the material search computing system could render a respective image for a particular material data object. In some cases, the material search computing system could render the respective image by applying one or more comparison space rendering parameters to the particular material data object, such as a lighting parameter or a geometry parameter.

FIG. 2 depicts an example of a computing environment 200 in which a material search computing system 210 is configured for generating a joint feature comparison space 250. In addition, the material search computing system 210 is configured for determining one or more material query results by comparing joint image-text feature sets that are encoded in the joint feature comparison space 250. In the computing environment 200, the material search computing system 210 is configured to exchange data (e.g., via one or more computing networks) with one or more additional computing systems, such as one or more user computing devices (e.g., the user computing device 190). The material search computing system 210 includes one or more of the joint feature comparison space 250, a material data object library 260, a joint image-text feature extraction neural network 220, a comparison engine 240, or a rendering engine 280. FIG. 2 depicts the material search computing system 210 as including the joint feature comparison space 250, the material data object library 260, the joint feature neural network 220, the comparison engine 240, and the rendering engine 280, but other implementations are possible. For example, a material search computing system could be configured to communicate with one or more additional computing systems that implement a material data object library or a rendering engine.

The material search computing system 210 generates one or more images based on respective surface material data objects included in the material data object library 260. For example, the rendering engine 280 renders one or more images by applying path tracer techniques, rasterized rendering (e.g., real-time rendering), or other suitable rendering techniques, to one or more surface material data objects included in the material data object library 260. In some cases, the material search computing system 210 generates the one or more images based on a particular set of one or more rendering criteria that are associated with the joint feature comparison space 250. For example, in the material search computing system 210, the rendering engine 280 includes (or is otherwise capable of accessing) a set of one or more rendering criteria 283 that are associated with the joint feature comparison space 250. In some cases, the rendering criteria 283 include one or more comparison space rendering parameters that establish consistency among joint image-text feature sets that are extracted by the joint feature neural network 220. For example, the rendering criteria 283 include could include one or more lighting parameters that establish a consistent lighting for images rendered by the rendering engine 280, such as lighting parameters that indicate a particular spectrum (e.g., sunlight, full visible spectrum), a particular intensity (e.g., daylight, relatively high intensity), a particular direction (e.g., downward direction, ambient direction), or other lighting parameters that can be interpreted by a rendering engine. In addition, the rendering criteria 283 include could include one or more geometry parameters that establish a consistent geometric object that is depicted in images rendered by the rendering engine 280, such as geometry parameters that indicate a particular shape (e.g., sphere, plane), a particular contour (e.g., flat surface, rippled surface), or other geometry parameters that can be interpreted by a rendering engine. Additional examples of comparison space rendering parameters can include parameters describing image resolution, color (e.g., hue, saturation, RGB palette), or other parameters that establish consistency among joint image-text feature sets extracted from rendered images.

In the material search computing system 210, the rendering engine 280 generates one or more rendered images, such as a set of rendered images 285, by applying one or more of the rendering criteria 283 to respective material data objects included in the material data object library 260. In some cases, each rendered image in the set of rendered images 285 depicts a respective material data object from the material data object library 260. In addition, each rendered image in the set of rendered images 285 depicts the respective material data object with consistent characteristics that are indicated by one or more comparison space rendering parameters included in the rendering criteria 283. In some cases, the rendering criteria 283 include comparison space rendering parameters that are associated with the joint feature comparison space 250, such as comparison space rendering parameters that provide a consistent comparison space. For example, each particular rendered image in the set of rendered images 285 depicts a consistent object indicated by one or more geometry parameters in the rendering criteria 283 with consistent illumination indicated by one or more lighting parameters included in the rendering criteria 283, such as a plane with a flat surface that is illuminated by high-intensity sunlight. In addition, each particular rendered image depicts the consistent illuminated object with a surface material described by the respective material data object, such as wood, glass, stone, water, brick, leather, or other example surface materials. In the material search computing system 210, the rendering engine 280 generates the set of rendered images 285 to depict the consistent characteristics indicated by the rendering criteria 283 in combination with the respective surface materials indicated by the respective material data objects from the material data object library 260. Continuing with the example consistent illuminated object described above, such as the flat plane illuminated by high-intensity sunlight, the rendering engine 280 generates each respective one of the rendered images 285 to depict the flat plane with respective surfaces of wood, glass, stone, water, brick, leather, or other example surface materials that are illuminated by high-intensity sunlight.

In FIG. 2, the material search computing system 210 generates the joint feature comparison space 250 based on joint image-text feature sets that are extracted from each rendered image in the set of rendered images 285. In some cases, the material search computing system 210 generates the joint feature comparison space 250 as a common embedding space for multi-type features, such as an embedding space in which image features and text features can be commonly encoded. In addition, the joint feature comparison space 250 is generated based on joint image-text feature sets that combine the consistent characteristics indicated by the rendering criteria 283 with the respective surface materials indicated by the respective material data objects from the material data object library 260. For example, the joint feature neural network 220 extracts a respective joint image-text feature set from each rendered image in the set of rendered images 285. An example of a joint feature neural network can include a vision-language model, such as the Contrastive Language-Image Pretraining model (also known as "CLIP") or the Adobe One model, but other implementations are possible. In addition, each extracted joint image-text feature set describes respective features of the respective material data object in combination with the consistent rendering characteristics from the rendering criteria 283. In some cases, generating the joint feature comparison space 250 based on joint image-text feature sets that combine consistent rendering characteristics with respective surface materials provides a consistent comparison space in which embedded features vary based on the respective surface material while avoiding variance caused by geometry, lighting, or other consistent rendering characteristics. For example, the joint feature comparison space 250 can be generated as a data object describing a vector embedding space, in which the joint image-text features that combine the consistent rendering characteristics with the respective surface materials are encoded. In some implementations, a material search computing system that generates a joint feature comparison space based on joint image-text feature sets that combine consistent rendering characteristics with respective surface materials can provide more accurate material query results, such as by reducing a quantity of false positive search results. For example, the material search computing system 210 can utilize the joint feature comparison space 250 to reduce false positive results that incorrectly match a rendering characteristic while failing to match a surface material characteristic.

In FIG. 2, the material search computing system 210 receives one or more query data objects, such as a query data object 230. In some cases, the material search computing system 210 receives the query data object 230 from an additional computing system, such as the user computing device 190 described in regard to FIG. 1. The query data object 230 includes query data, such as one or more of text data or image data. In addition, the material search computing system 210 generates a query joint feature set 235 by applying the joint feature neural network 220 to the query data object 230. In some cases, the query joint feature set 235 includes joint image-text features that describe characteristics of the query data object 230. For example, if the query data object 230 includes text data indicating "dark blue water with waves," the query joint feature set 235 can include joint image-text features that describe characteristics of the text data. As an additional example, if the query data object 230 includes image data that includes a digital image of dark-colored water with waves, the query joint feature set 235 can include joint image-text features that describe characteristics of the image data.

In some cases, the comparison engine 240 (or another component of the material search computing system 210) compares the query joint feature set 235 with additional features that are embedded in the joint feature comparison space 250. For example, the comparison engine 240 calculates one or more relationships, such as cosine distances, among joint image-text features that are included in the query joint feature set 235 and additional joint image-text features that are embedded in the joint feature comparison space 250. In addition, the comparison engine 240 identifies one or more result sets of joint image-text features, such as a result joint feature set 243, that have a particular calculated relationship with the query joint feature set 235. For example, the comparison engine 240 identifies one or more result joint image-text features embedded in the joint feature comparison space 250 that have a minimum distance, or are within a threshold distance, of one or more joint image-text features included in the query joint feature set 235. In addition, the comparison engine 240 includes the identified result joint image-text features (e.g., having the minimum distance, satisfying the threshold distance) in the result joint feature set 243.

Based on the comparison of the query joint feature set 235 with the joint feature comparison space 250, the material search computing system 210 identifies one or more result surface material data objects, such as a group of one or more result material data objects 247. For example, the material search computing system 210 identifies one or more surface material data objects (e.g., from the material data object library 260) that correspond to the result joint feature set 243, such as surface material data objects from which the result joint image-text features were extracted. In some cases, the material search computing system 210 generates material query result data 245 that includes (or otherwise indicates) one or more of the result material data objects 247. In addition, the material search computing system provides the material query result data 245 to an additional computing system, such as the user computing device 190 described in regard to FIG. 1.

FIG. 3 is a flow chart depicting an example of a process 300 for determining surface material query results by comparing joint image-text feature sets that are encoded in a joint feature comparison space. In some embodiments, such as described in regards to FIGS. 1-2, a computing device executing a material search computing system implements operations described in FIG. 3, by executing suitable program code. For illustrative purposes, the process 300 is described with reference to the examples depicted in FIGS. 1-2. Other implementations, however, are possible.

At block 310, the process 300 involves receiving one or more query data objects. In some cases, a material search computing system receives a query data object from an additional computing system, such as a user computing device. In addition, the query data object includes surface material query data, such as one or more of text data or image data. For example, the material search computing system 210 receives the query data object 230 from an additional computing system, such as the user computing device 190. In addition, the query data object 230 incudes one or more of text data or image data.

At block 320, the process 300 involves generating a query joint feature set that is based on the query data object. In some cases, a joint image-text feature extraction neural network included in the material search computing system extracts one or more joint image-text features from the query data object. In addition, the query joint feature set includes the extracted joint image-text features. For example, the joint feature neural network 220 extracts one or more joint image-text features from the query data object 230. In addition, the joint feature neural network 220 (or another component of the material search computing system 210) generates the query joint feature set 235 that includes the joint image-text features extracted from the query data object 230. In some cases, the joint feature neural network extracts multiple sets of joint image-text features based on a particular query data object. For example, the query data object could include multiple surface material query data objects, such as text data and image data. In this example, the joint feature neural network could extract a first set of joint image-text features that indicate characteristics of the text data and a second set of joint image-text features that indicate characteristics of the image data. Continuing with this example, the material search computing system could generate a particular query joint feature set that includes the first set of joint image-text features and the second set of joint image-text features. In addition, the material search computing system could generate multiple query joint feature sets, such as a first query joint feature set that includes the first set of joint image-text features and a second query joint feature set that includes the second set of joint image-text features.

At block 330, the process 300 involves accessing a joint feature comparison space. In some cases, the joint feature comparison space includes one or more additional joint image-text features. In addition, the one or more additional joint image-text features are extracted respectively from one or more surface material data object. In some cases, the material search computing system generates the joint feature comparison space by extracting joint image-text features from a group of surface material data object. For example, the material search computing system 210 generates the joint feature comparison space 250 by combining multiple sets of joint image-text features that are extracted, via the joint feature neural network 220, from respective material data objects in the material data object library 260. In addition, the material search computing system 210 accesses the joint feature comparison space 250 responsive to one or more of receiving the query data object 230 or generating the query joint feature set 235.

At block 340, the process 300 involves identifying one or more result joint feature sets, such as a result joint feature set associated with the query data object. In some cases, a comparison engine included in the material search computing system identifies the result joint feature set by comparing one or more of the joint image-text features included in the query joint feature set with one or more of the additional joint image-text features included in the joint feature comparison space. For example, the comparison engine 240 compares features from the query joint feature set 235 with additional features included in the joint feature comparison space 250. Based on the comparison, the comparison engine 240 identifies the result joint feature set 243.

At block 350, the process 300 involves accessing one or more result surface material data objects that correspond to the one or more result joint feature sets. In some cases, the material search computing system generates material query result data based on the one or more result surface material data objects, such as material query result data that includes or otherwise indicates the result surface material data objects. For example, the comparison engine could identify a first result joint feature set, a second result joint feature set, and a third result joint feature set based on the comparison of the joint image-text features included in with the additional joint image-text features. Continuing with this example, the comparison engine (or another component of the material search computing system) could identify, such as from a library of material data objects, a first result surface material data object corresponding to the first result joint feature set, a second result surface material data object corresponding to the second result joint feature set, and a third result surface material data object corresponding to the third result joint feature set. In addition, the comparison engine (or another component of the material search computing system) could generate material query result data that includes the first, second, and third result surface material data objects. For example, the material search computing system 210 identifies one or more of the result material data objects 247 that correspond to the result joint feature set 243. In addition, the material search computing system 210 generates the material query result data 245 that includes the result material data objects 247.

At block 360, the process 300 involves providing material query result data, such as the material query result data generated by the comparison engine, to one or more additional computing systems. In addition, the material query result data includes or otherwise indicates the result surface material data objects. In some cases, the comparison engine (or another component of the material search computing system) provides the material query result data to the additional computing system from which the query data object was received, as described in regard to block 310. For example, the material search computing system 210 provides the material query result data 245 to a user computing device (e.g., the user computing device 190) that provided the query data object 230.

Figure 4:
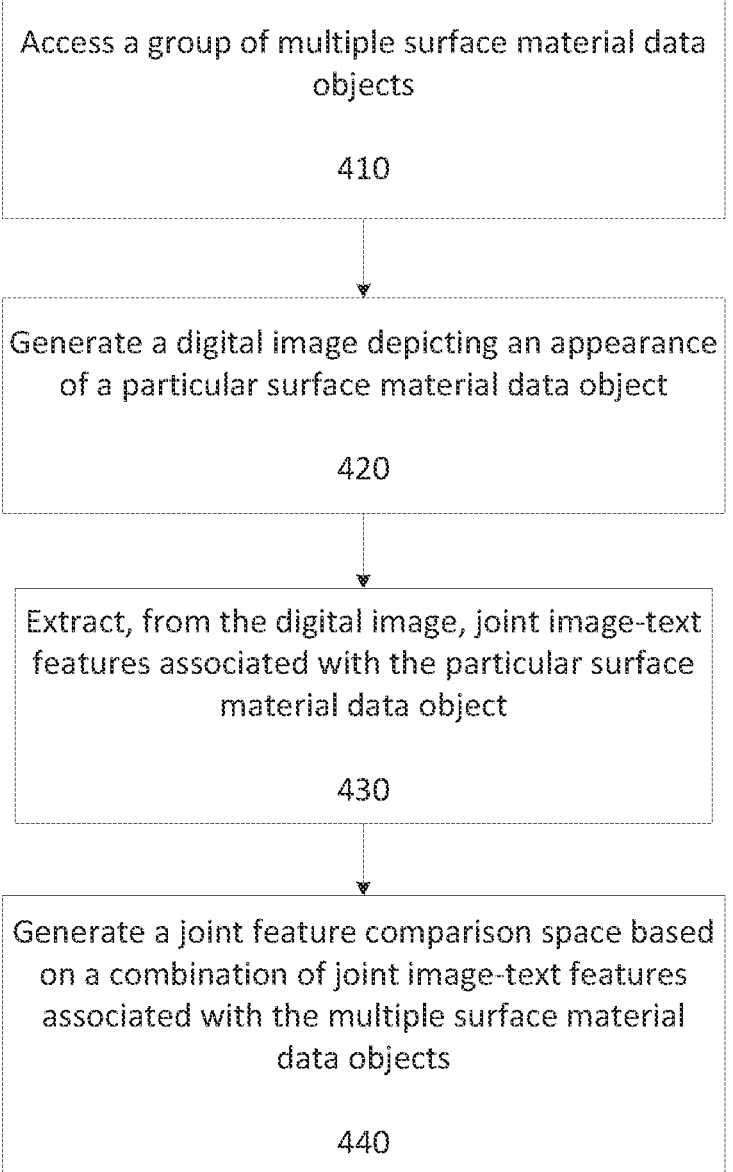
FIG. 4 is a flow chart depicting an example of a process for generating a joint feature comparison space that is a consistent comparison space for identifying result surface material data objects, according to certain embodiments.

FIG. 4 is a flow chart depicting an example of a process 400 for generating a joint feature comparison space that is a consistent comparison space for identifying result surface material data objects. In some embodiments, such as described in regards to FIGS. 1-3, a computing device executing a material search computing system implements operations described in FIG. 4, by executing suitable program code. For illustrative purposes, the process 400 is described with reference to the examples depicted in FIGS. 1-3. Other implementations, however, are possible.

At block 410, the process 400 involves accessing one or more surface material data objects, such as a group of multiple surface material data objects. In some cases, a material search computing system accesses a material data object library that includes the group of multiple surface material data objects. For example, the material search computing system 210 accesses the material data object library 260.

At block 420, the process 400 involves generating one or more digital images based on the one or more surface material data objects. In addition, each of the one or more digital images, respectively, depicts an appearance of the one or more surface material data objects. In some cases, a rendering engine included in the material search computing system generates a respective digital image for each particular surface material data object that is included in the group of multiple surface material data objects. For example, the rendering engine 280 generates the rendered images 285 based on a group of surface material data objects included in the material data object library 260. In addition, each respective digital image in the rendered images 285 depicts an appearance of a particular surface material data object from the group. In some cases, block 420 involves accessing one or more rendering criteria, such as rendering criteria that include (or otherwise indicate) comparison space rendering parameters by which the rendering engine generates the respective digital images for the group of multiple surface material data objects. For example, the rendering engine 280 generates the rendered images 285 by applying one or more comparison space rendering parameters indicated by the rendering criteria 283.

At block 430, the process 400 involves extracting one or more joint image-text features from the one or more generated digital images. In some cases, the joint image-text features extracted from a particular digital image are associated with a particular surface material data object from with the particular digital image is generated. For example, a joint image-text feature extraction neural network included in the material search computing system is applied to each respective digital image that is generated by the rendering engine. In addition, the joint feature neural network extracts respective joint image-text features from each of the respective digital images. For example, the joint feature neural network 220 extracts respective joint image-text features from each respective image in the rendered images 285.

At block 440, the process 400 involves generating a joint feature comparison space based on a combination of the extracted joint image-text features. In some cases, the material search computing system generates the joint feature comparison space by combining the respective joint image-text features from each of the respective digital images. In addition, the joint feature comparison space includes joint image-text features that represent characteristics, such as visual appearance characteristics, of each particular surface material data object that is included in the group of multiple surface material data objects. In some cases, the comparison space rendering parameters describes in regard to block 420 provide a consistent comparison space, e.g., the joint feature comparison space, in which joint image-text features can be embedded. For example, the material search computing system 210 generates the joint feature comparison space 250 by combining the joint image-text features extracted from the rendered images 285. In addition, the joint feature comparison space 250 provides a consistent comparison space in which additional joint image-text features can be embedded, such as additional joint image-text features extracted from the query data object 230.

In some embodiments, one or more operations related to the process 400 are repeated. For example, operations related to one or more of blocks 420 or 430 can be repeated for multiple surface material data objects, such as multiple surface material data objects from the material data object library 260.

Figure 5:
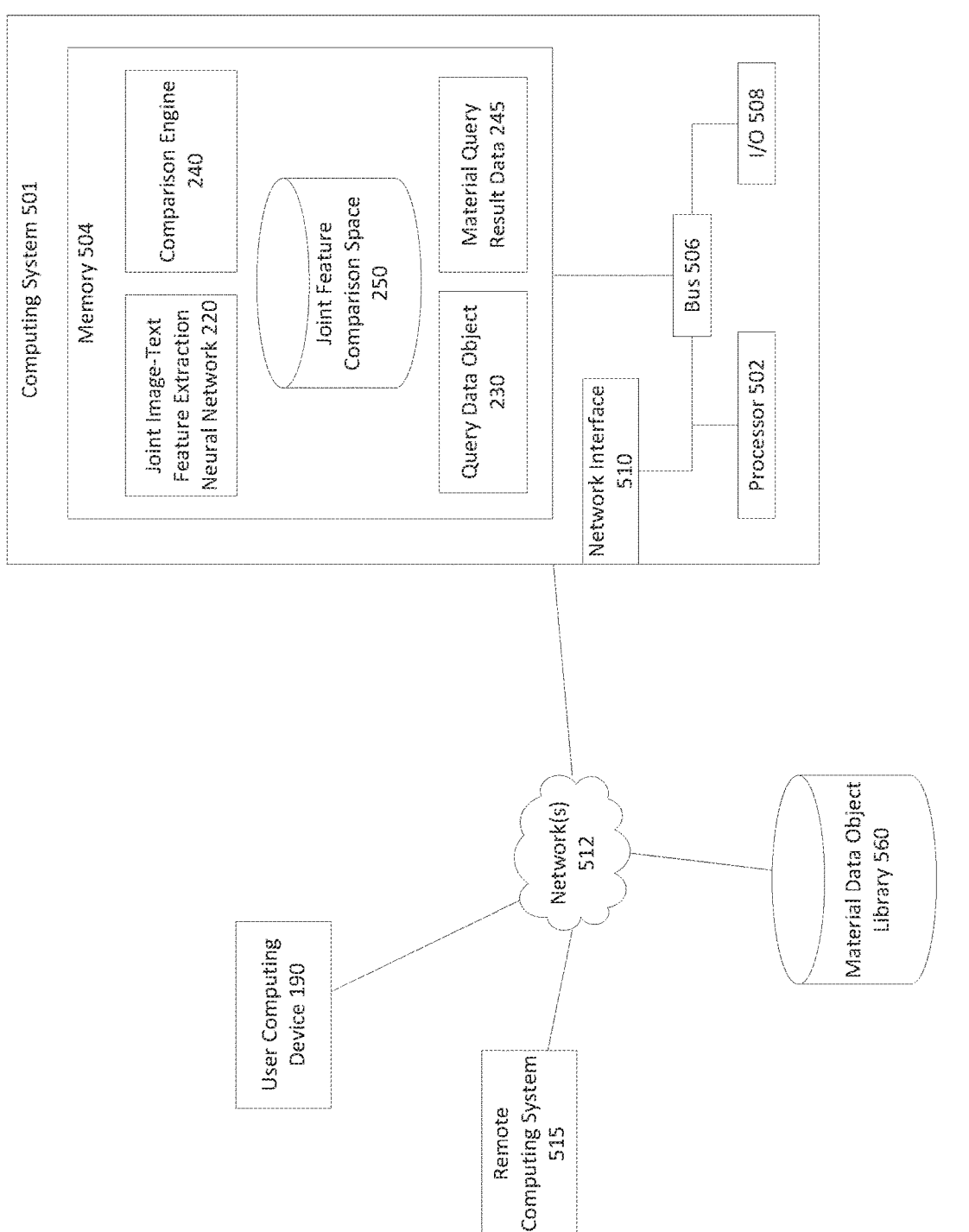
FIG. 5 is a block diagram depicting an example of a computing system for implementing a material search computing system, according to certain embodiments.

Any suitable computing system or group of computing systems can be used for performing the operations described herein. For example, FIG. 5 is a block diagram depicting a computing system configured to implement a material search computing system, according to certain embodiments.

The depicted example of a computing system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the joint feature neural network 220, the joint feature comparison space 250, the comparison engine 240, the query data object 230, the material query results data 245, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the processor 502 to perform one or more of the operations described above with respect to FIGS. 1-4. The program code includes operations related to, for example, one or more of the joint feature neural network 220, the joint feature comparison space 250, the comparison engine 240, the query data object 230, the material query results data 245, or other suitable applications or memory structures that perform one or more operations described herein. The program code may be resident in the memory device 504 or any suitable computer-readable medium and may be executed by the processor 502 or any other suitable processor. In some embodiments, the program code described above, the joint feature neural network 220, the joint feature comparison space 250, the comparison engine 240, the query data object 230, and the material query results data 245 are stored in the memory device 504, as depicted in FIG. 5. In additional or alternative embodiments, one or more of the joint feature neural network 220, the joint feature comparison space 250, the comparison engine 240, the query data object 230, the material query results data 245, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. A remote computing system 515 is connected to the computing system 501 via network 512, and the remote computing system 515 can perform some of the operations described herein, such as rendering digital images or maintaining a surface material data object library. The computing system 501 is able to communicate with one or more of the remote computing system 515, the user computing device 190, and a remote material data object library 560 using the network interface 510. Although FIG. 5 depicts the material data object library 560 as being connected to the computing system 501 via the networks 512, other embodiments are possible, including a surface material data object library, such as the libraries 160 or 260, running as a program in the memory 504 of the computing system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for identifying a surface material for a digital three-dimensional graphical object, the method comprising operations that, when executed by one or more processors, cause the one or more processors to perform:

receiving, from an additional computing device, a query data object that includes text data or image data;

generating, based on the query data object, a query joint feature set that includes joint image-text features that are extracted from the query data object;

accessing a joint feature comparison space that includes additional joint image-text features that are extracted from one or more surface material data objects;

calculating, within the joint feature comparison space, i) a first feature relationship between the query joint feature set corresponding to the query data object and a result joint feature set corresponding to a result surface material data object and ii) a second feature relationship between the query joint feature set corresponding to the query data object and an additional joint feature set corresponding to an additional surface material data object;

based on a comparison of the first feature relationship and the second feature relationship, determining that, within the joint feature comparison space, the result joint feature set is nearer to the query joint feature set than the additional joint feature set;

identifying the result joint feature set based on the determination that the result joint feature set is nearer to the query joint feature set than the additional joint feature set;

accessing the result surface material data object that corresponds to the result joint feature set; and providing, to the additional computing device, material query result data indicating the result surface material data object.

2. The method of claim 1, wherein the query joint feature set is generated by applying a joint image-text feature extraction neural network to the query data object.

3. The method of claim 1, further comprising:

accessing a group of multiple surface material data objects;

for each particular surface material data object in the group of multiple surface material data objects:

generating a respective digital image depicting an appearance of the particular surface material data object, and extracting, from the respective digital image, respective joint image-text features associated with the particular surface material data object by applying a joint image-text feature extraction neural network to the respective digital image; and generating the joint feature comparison space based on a combination of the respective joint image-text features associated with each particular surface material data object in the group of multiple surface material data objects.

4. The method of claim 3, wherein generating the respective digital image includes rendering the particular surface material data object based on one or more comparison space rendering parameters associated with the joint feature comparison space.

5. The method of claim 1, wherein:

calculating the first feature relationship within the joint feature comparison space includes calculating a first cosine distance between the query joint feature set and the result joint feature set, and calculating the second feature relationship within the joint feature comparison space includes calculating a second cosine distance between the query joint feature set and the additional joint feature set, wherein the determining that, within the joint feature comparison space, the result joint feature set is nearer to the query joint feature set than the additional joint feature set is based on a comparison of the first cosine distance and the second cosine distance.

6. The method of claim 1, wherein:

the result surface material data object describes an appearance of a digital three-dimensional graphical object, and the result joint feature set is generated by applying a joint feature extraction neural network to a rendered digital image depicting the appearance of the digital three-dimensional graphical object.

7. The method of claim 1, wherein the material query result data configures a user interface component of the additional computing device to display a digital image depicting an appearance of the result surface material data object.

8. A system for identifying a surface material for a digital three-dimensional graphical object, the system comprising:

a joint image-text feature extraction neural network configured for:

accessing a query data object that includes text data or image data, the query data object being received from an additional computing device, and generating, based on the query data object, a query joint feature set that includes joint image-text features that are extracted from the query data object; and a comparison engine configured for:

accessing a joint feature comparison space that includes additional joint image-text features that are extracted from one or more surface material data objects, calculating, within the joint feature comparison space, i) a first feature relationship between the query joint feature set corresponding to the query data object and a result joint feature set corresponding to a result surface material data object and ii) a second feature relationship between the query joint feature set corresponding to the query data object and an additional joint feature set corresponding to an additional surface material data object, based on a comparison of the first feature relationship and the second feature relationship, determining that, within the joint feature comparison space, the result joint feature set is nearer to the query joint feature set than the additional joint feature set, identifying the result joint feature set based on the determination that the result joint feature set is nearer to the query joint feature set than the additional joint feature set, accessing the result surface material data object that corresponds to the result joint feature set, and providing, to the additional computing device, material query result data indicating the result surface material data object.

9. The system of claim 8, wherein the query joint feature set is generated by applying the joint image-text feature extraction neural network to the query data object.

10. The system of claim 8, further comprising a rendering engine, wherein the rendering engine is configured for:

accessing a group of multiple surface material data objects, and for each particular surface material data object in the group of multiple surface material data objects, generating a respective digital image depicting an appearance of the particular surface material data object; and wherein the joint image-text feature extraction neural network is further configured for:

extracting, from each respective digital image, respective joint image-text features associated with the particular surface material data object, wherein the joint feature comparison space is generated based on a combination of the respective joint image-text features associated with each particular surface material data object in the group of multiple surface material data objects.

11. The system of claim 10, wherein generating the respective digital image includes rendering the particular surface material data object based on one or more comparison space rendering parameters associated with the joint feature comparison space.

12. The system of claim 8, wherein:

calculating the first feature relationship within the joint feature comparison space includes calculating a first cosine distance between the query joint feature set and the result joint feature set, and calculating the second feature relationship within the joint feature comparison space includes calculating a second cosine distance between the query joint feature set and the additional joint feature set, wherein the determining that, within the joint feature comparison space, the result joint feature set is nearer to the query joint feature set than the additional joint feature set is based on a comparison of the first cosine distance and the second cosine distance.

13. The system of claim 8, wherein:

the result surface material data object describes an appearance of a digital three-dimensional graphical object, and the result joint feature set is generated by applying a joint feature extraction neural network to a rendered digital image depicting the appearance of the digital three-dimensional graphical object.

14. The system of claim 8, wherein the material query result data configures a user interface component of the additional computing device to display a digital image depicting an appearance of the result surface material data object.

15. A non-transitory computer-readable medium embodying program code for identifying a surface material for a digital three-dimensional graphical object, the program code comprising operations that, when executed by one or more processors, cause the one or more processors to perform:

receiving, from an additional computing device, a query data object that includes text data or image data;

generating, based on the query data object, a query joint feature set that includes joint image-text features that are extracted from the query data object;

accessing a joint feature comparison space that includes additional joint image-text features that are extracted from one or more surface material data objects;

calculating, within the joint feature comparison space, i) a first feature relationship between the query joint feature set corresponding to the query data object and a result joint feature set corresponding to a result surface material data object and ii) a second feature relationship between the query joint feature set corresponding to the query data object and an additional joint feature set corresponding to an additional surface material data object;

based on a comparison of the first feature relationship and the second feature relationship, determining that, within the joint feature comparison space, the result joint feature set is nearer to the query joint feature set than the additional joint feature set;

identifying the result joint feature set based on the determination that the result joint feature set is nearer to the query joint feature set than the additional joint feature set;

accessing the result surface material data object that corresponds to the result joint feature set; and providing, to the additional computing device, material query result data indicating the result surface material data object.

16. The non-transitory computer-readable medium of claim 15, wherein the query joint feature set is generated by applying a joint image-text feature extraction neural network to the query data object.

17. The non-transitory computer-readable medium of claim 15, the program code further comprising operations that cause the one or more processors to perform:

accessing a group of multiple surface material data objects;

for each particular surface material data object in the group of multiple surface material data objects:

generating a respective digital image depicting an appearance of the particular surface material data object, and extracting, from the respective digital image, respective joint image-text features associated with the particular surface material data object by applying a joint image-text feature extraction neural network to the respective digital image; and generating the joint feature comparison space based on a combination of the respective joint image-text features associated with each particular surface material data object in the group of multiple surface material data objects.

18. The non-transitory computer-readable medium of claim 17, wherein generating the respective digital image includes rendering the particular surface material data object based on one or more comparison space rendering parameters associated with the joint feature comparison space.

19. The non-transitory computer-readable medium of claim 15, wherein:

calculating the first feature relationship within the joint feature comparison space includes calculating a first cosine distance between the query joint feature set and the result joint feature set, and calculating the second feature relationship within the joint feature comparison space includes calculating a second cosine distance between the query joint feature set and the additional joint feature set, wherein the determining that, within the joint feature comparison space, the result joint feature set is nearer to the query joint feature set than the additional joint feature set is based on a comparison of the first cosine distance and the second cosine distance.

20. The non-transitory computer-readable medium of claim 15, wherein:

the result surface material data object describes an appearance of a digital three-dimensional graphical object, and the result joint feature set is generated by applying a joint feature extraction neural network to a rendered digital image depicting the appearance of the digital three-dimensional graphical object.

* * * * *